United States Patent [19]
Heeger et al.

[11] Patent Number: 4,657,694
[45] Date of Patent: Apr. 14, 1987

[54] ELECTRICALLY CONDUCTIVE LIQUID CRYSTALLINE SUBSTANCE AND POLYMER

[75] Inventors: Alan J. Heeger, Santa Barbara, Calif.; Haruo Yoshida, Oita; Kazumi Naito, Kanagawa; Yukio Kobayashi, Tokyo, all of Japan

[73] Assignee: Showa Denko Kabushiki Kaisha, Tokyo, Japan

[21] Appl. No.: 537,210

[22] Filed: Sep. 29, 1983

[30] Foreign Application Priority Data

Sep. 30, 1982 [JP] Japan .................................. 57-169882
Sep. 30, 1982 [JP] Japan .................................. 57-169883

[51] Int. Cl.$^4$ .................... C09K 19/58; C09K 19/54
[52] U.S. Cl. ........................... 252/299.01; 252/299.3; 252/299.2; 252/299.5; 526/292.3
[58] Field of Search .............. 252/299.2, 299.3, 299.5, 252/299.01; 526/292.3

[56] References Cited

U.S. PATENT DOCUMENTS

| | | | |
|---|---|---|---|
| 3,814,700 | 6/1974 | Aviram | 252/299.5 X |
| 3,838,059 | 9/1974 | Wong | 252/299.5 |
| 3,920,576 | 11/1975 | Jones, Jr. et al. | 252/299.3 |
| 3,932,298 | 1/1976 | Labes | 252/299.3 |
| 3,956,167 | 5/1976 | Oh | 252/299.2 |
| 3,975,285 | 8/1976 | Ohnishi et al. | 252/299.3 X |
| 3,979,320 | 9/1976 | Ozutsumi | 252/299.3 |
| 3,990,984 | 11/1976 | Barret et al. | 252/299.3 X |
| 4,066,569 | 1/1978 | Lim | 252/299.5 X |
| 4,088,393 | 5/1978 | Hirano | 252/299.3 |
| 4,249,013 | 2/1981 | Haddon et al. | 252/299.3 X |
| 4,366,080 | 12/1982 | Mizunoya et al. | 252/299.3 |

FOREIGN PATENT DOCUMENTS

| | | | |
|---|---|---|---|
| 51768 | 5/1982 | European Pat. Off. | 252/299.3 |
| 3125758 | 1/1983 | Fed. Rep. of Germany | 252/299.3 |
| 51-72984 | 6/1976 | Japan | 252/299.3 |
| 56-147881 | 11/1981 | Japan | 252/299.3 |
| 463692 | 3/1975 | U.S.S.R. | 252/299.3 |

OTHER PUBLICATIONS

Baise, et al., "Effect of Charge-Transfer . . . ", App. Phys. Lett. vol. 21, No. 4, 15 Aug. 1972, 142–143.
Foster, Organic Charge-Transfer Complexes, pp. 52–53, 386–388.
Lipatov, et al., "Structural Features . . . ", Advances in Liq. Cryst Research & Appl; 1980, pp. 943–957.

*Primary Examiner*—Teddy S. Gron
*Assistant Examiner*—Catherine S. Kilby
*Attorney, Agent, or Firm*—Sughrue, Mion, Zinn, Macpeak & Seas

[57] ABSTRACT

An electrically conductive liquid crystalline substance represented by the general formula L-$S_1$-$C_T$ or L-$C_T$, wherein L is a residue of a liquid crystalline substance, $S_1$ is an atom or atomic grouping which becomes a spacer and $C_T$ is a charge-transfer complex, is disclosed. An electrically conductive liquid crystalline polymer having an electrically conductive liquid crystalline substance portion in its side chain is also provided. These electrically conductive liquid crystalline materials are useful in the conventional applications of liquid crystals and in other applications which utilize their electrical conductivity.

11 Claims, No Drawings

ELECTRICALLY CONDUCTIVE LIQUID CRYSTALLINE SUBSTANCE AND POLYMER

FIELD OF THE INVENTION

This invention relates to a novel electrically conductive liquid crystalline substance and a novel electrically conductive liquid crystalline polymer.

BACKGROUND OF THE INVENTION

A liquid crystal shows great anisotropy in its dielectric constant, magnetic susceptibility or refractive index. Attempts have been made extensively to apply liquid crystals to various display devices by properly combining the properties inherent to liquid crystals, and various products using liquid crystals such as electronic portable calculators have been marketed. It is expected that various products utilizing the characteristics of liquid crystals will be extensively developed in future.

In addition to conducting research on the utility of liquid crystals, basic research work on the properties of liquid crystals have also been extensively undertaken. However, liquid crystalline substances or polymers having electric conductivity have not yet been developed.

SUMMARY OF THE INVENTION

It is an object of this invention to provide a novel electrically conductive liquid crystalline substance which has electric conductivity in addition to the character of a liquid crystal.

Another object of this invention is to provide a novel electrically conductive liquid crystalline polymer which has electric conductivity in addition to the character of a liquid crystal.

According to this invention, there is provided an electrically conductive liquid crystalline substance represented by the following general formula (I) or (II)

$$L-S_1-C_T \quad (I)$$

$$L-C_T \quad (II)$$

wherein L is a residue of a liquid crystalline substance, $S_1$ is an atom or atomic grouping which becomes a spacer, and $C_T$ is a charge-transfer complex.

According to another aspect of this invention, there is provided an electrically conductive liquid crystalline polymer having an electrically conductive liquid crystalline substance portion in its side chain.

DETAILED DESCRIPTION OF THE INVENTION

In the electrically conductive liquid crystalline substance of the invention, a residue of a liquid crystal can be introduced by utilizing known liquid crystalline substances such as nematic, smectic and cholesteric. Of these, smectic liquid crystalline substances such as those having a 4-oxybenzoate structure are preferred because they permit easy three-dimensional orientation of charge-transfer molecules, but the choice varies from case to case.

Many examples of such liquid crystalline substances have already been proposed, and, for example, a Japanese language publication entitled "Fundamentals and Applications of Liquid Crystalline Electronics", edited by Akio Sasaki, published by Ohm Co., Ltd. on Dec. 30, 1981 pages 205 to 217 gives many examples.

Illustrative of nematic or smectic liquid crystals which can be used in this invention are (1) aromatic compounds, for example, (a) azomethine compounds such as 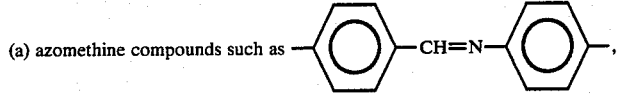

(b) azo and azoxy compounds such as 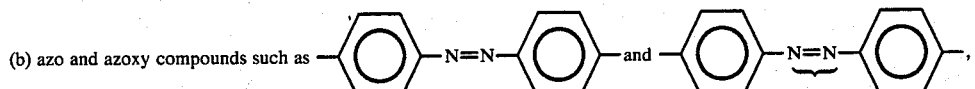

(c) esters such as 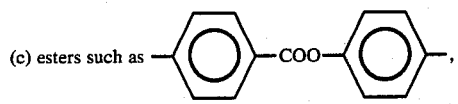

(d) stilbene compounds such as 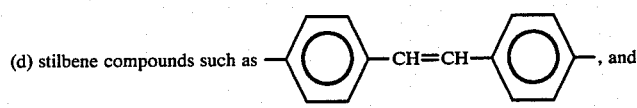, and (e) biphenyl and terphenyl compounds such as 

(2) trans-cyclohexane compounds such as 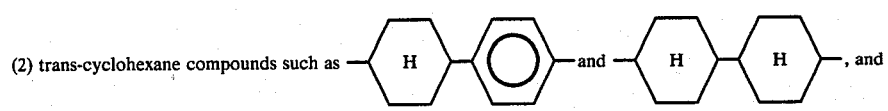, and (3) pyrimidine compounds such as 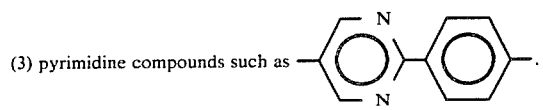

Preferred examples of nematic or smectic crystals include anisylidene-4-aminophenyl acetate, 4-methyl-4'-n-butylbenzylideneaniline, 4-ethoxy-4'-n-butylbenzylideneaniline, 4-n-hexyl-4'-cyanobenzylideneaniline, 4-n-butyl-4'-n-hexyloxyazobenzene, 4-ethyl-4'-n-hexanoyloxyazobenzene, p-azoxyanisole, 4-methoxy-4'-n-butylazoxybenzene, 4-hexylcarbonato-4'-heptoxyphenyl benzoate, 4'-n-hexyloxyphenyl-4-n-butyl benzoate, 4'-n-pentyl-4-n-heptyl thiobenzoate, 4'-n-pentyl-4-cyanobiphenyl, 4'-n-heptoxy-4-cyanobiphenyl, terephthalal-bis-(4-n-butylaniline), 4,4'-azoxybenzoic acid diethyl ester, 4,4'-di-n-dodecyloxyazoxybenzene, 4-(4-acetoxy)-benzylideneaminoethyl cinnamate, 2,5-bis-(4-n-propylphenyl)pyrimidine, 4,4'-diethoxystilbene, 4-(trans-4-pentylcyclohexyl)benzonitrile and 5-n-heptyl-2-(4-cyanophenyl)pyrimidine.

Illustrative of cholesteric liquid crystals and cholesterol derivatives and chiral mesogen substances, such as cholesteryl benzoate and 4-(3-methylpentyl)-4'-cyanobiphenyl.

These liquid crystalline substances may be used singly or in combination. Thus, for example, the bonding at the portion L in the above-given formulae may be as follows:

wherein $L_1$ and $L_2$ each represents a residue of a liquid crystalline substance.

A charge-transfer complex is involved in the imparting of electric conductivity in the electrically conductive liquid crystalline substance of this invention. In other words, electric conductivity is developed by a charge-transfer complex composed of a host component (including molecules) and a guest component (including molecules) which is bonded to the liquid crystal residue L directly or through a spacer. The host component (molecules) may be an electron donor and the guest component (molecules), an electron acceptor, or vice versa.

Examples of the electron donor are as follows:

(i) Aromatic hydrocarbons

Naphthalene, anthracene, phenanthrene, chrysene, pyrene, perylene, 1,2(or 3,4)-benzopyrene, coronene, pyranthrene, violanthrene, violanthrone, isoviolanthrene, isoviolanthrone, azulene, 4,6,8-trimethylazulene, hexamethylbenzene, diethoxydinaphthostilbene, phthalocyanine and β-carotene.

(ii) Aliphatic or aromatic amines

Indole, acridine, N-methylacridine, M-methylquinoline, benzidine, 1-methyl-2-picolinium ion, tetramethyl ammonium ion and trimethylphenyl ammonium ion.

(iii) Heteroaromatic amines

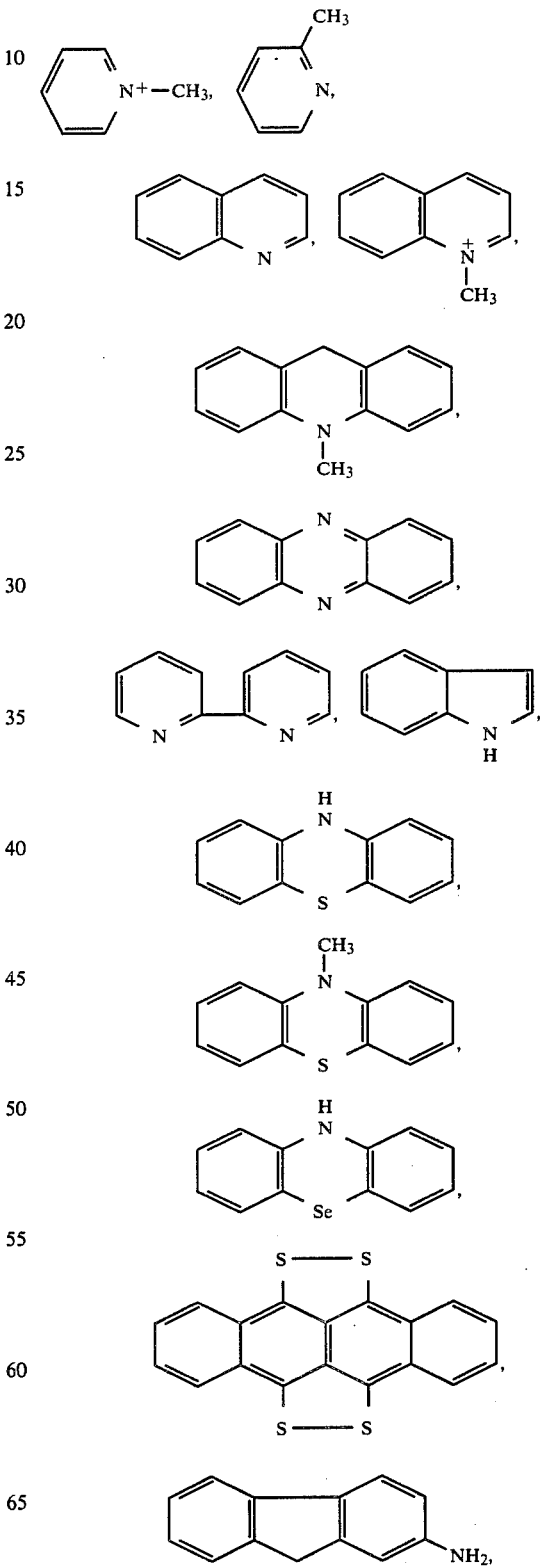

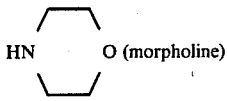 (morpholine)

conjugate base, such as 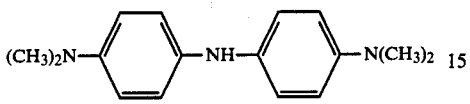

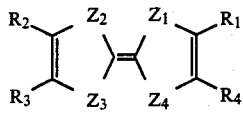

(iv) Fulvalene derivatives

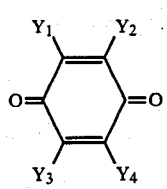

wherein $Z_1$ to $Z_4$ each represents an S or Se atom, and $R_1$ to $R_4$ each represents a hydrogen atom or an alkyl group having not more than 5 carbon atoms. Specific examples are tetrathiofulvalene (TTF), tetramethyltetrathiofulvalene, tetraselenofulvalene and tetramethyltetraselenofulvalene.

(v) Phthalocyanine and its derivatives (vi) Other electron donors $(C_6H_5)P^+(CH_3)$, and $(C_6H_5)_3As^+$—$CH_3$ Examples of the electron acceptor include the following.

(i) Halogens $I_2$, $Br_2$ and I-Cl (ii) Metal halides $AsF_5$, $SbF_5$, $SiF_4$, $PCl_5$, $PF_5$, $AlCl_3$, $AlBr_3$, $SnCl_4$ (iii) Tetracyanoquinodimethane (TCNQ) and its derivatives

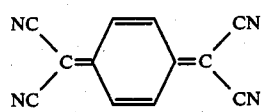

(iv) Tetracyanoethylene (TCNE) and its derivatives (v) Substituted benzoquinones p-Fluoranil, p-chloranil, p-iodochloranil, o-bromanil, 2,3-dicyano-5,6-dichlorobenzoquinone, 2,3-dicyano-5,6-dibromobenzoquinone,

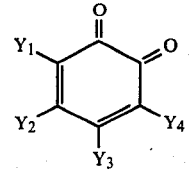

(wherein $Y_1$, $Y_2$, $Y_3$ and $Y_4$ each represents Br, Cl, I, F and CN), and

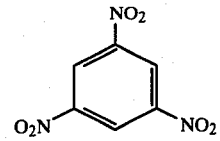

(wherein $Y_1$, $Y_2$, $Y_3$ and $Y_4$ are as defined above).

(vi) Trinitrobenzene such as

(vii) Perchlorate ($ClO_4$)

The charge-transfer complexes shown at pages 113 to 177 of "Polymeric Organic Semiconductors", translated by Eishun Tsuchida, published by Shokodo may also be used.

In general formula (I), the residue of a liquid crystalline substance is chemically bonded to a charge transfer complex via the spacer ($S_1$) such as ether linkage and ester linkage. Examples of the spacer ($S_1$) include those classified into two categories represented by the following structures:

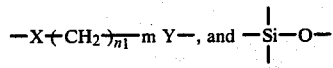

wherein X and Y each represents a chemical bond or any suitable divalent bridging radical such as

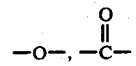

and $$-\overset{O}{\underset{\|}{C}}-O-$$

and $n_1$ is 0 or an integer of from 1 to 10.

It is necessary that the introduction of a liquid crystalline substance (a residue of a liquid crystal) be effected to prevent the loss of the liquid crystal characteristics. Furthermore, it is ncessary that the chemical bonding between the liquid crystal residue and the electrically conductive charge-transfer complex be carried out in such a manner as to avoid a loss of liquid crystal-like properties and electric conductivity.

The electrically conductive liquid crystalline substance can be obtained by complexing the acceptor component with the donor component bonded in advance to a liquid crystalline component, or by complexing the donor component to the acceptor component bonded in advance to the liquid crystalline component. The former is preferred, however.

Complexing may be performed chemically or electrochemically by methods known heretofore. A charge-transfer complex may be synthesized by mixing a solution of the donor component molecules with a solution of acceptor component molecules, or by directly contacting the donor component molecules with the acceptor component molecules. There is no restriction in this invention with regard to these methods.

The mole ratio of the donor molecules to the acceptor molecules is 10/1 to 1/10, preferably 4/1 to 1/4, more preferably 5/2 to 1/3.

For example, the electrically conductive liquid crystalline substance of the present invention can be produced by complexing the acceptor component with a donor-bonded liquid crystalline component represented by the formula (V):

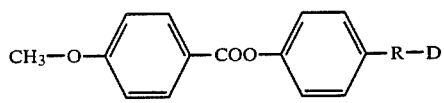
(V)

wherein R is

and D is a donor component, for example, an aromatic hydrocarbon such as

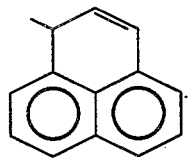

The compound of formula (V) can be obtained by the esterification reaction of 4-methoxybenzoic acid with a compound of formula (VI) obtained in accordance with the following reaction equation.

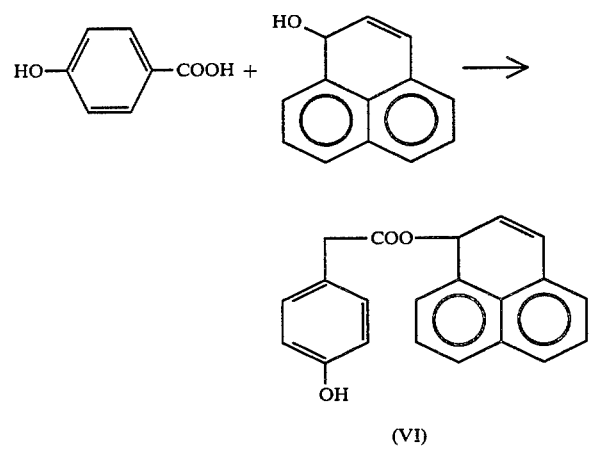
(VI)

If in the above formula R is —COO(CH$_2$)$_m$COO (wherein m is an integer of from 1 to 10) and D is

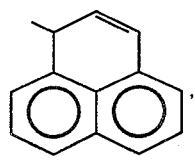

the above reaction is carried out in accordance with the following equation.

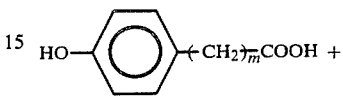

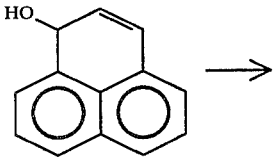

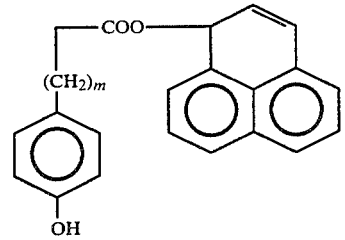
(VII)

The reaction of the compound of formula (VII) with 4-methoxybenzoic acid yields the corresponding ester.

The above description refers to the synthesis of the host component-bonded electrically conductive liquid crystalline component by esterification, but there can also be employed a method of synthesizing it by etherification, or a method of synthesis by alkylation utilizing a Grignard reaction, a Friedel-Crafts reaction, a Wurtz reaction, etc.

The electrically conductive liquid crystalline substance of this invention has an electrical conductivity of from $10^{-10}$ to 10 ohm$^{-1}$.cm$^{-1}$, preferably from $10^{-8}$ to 1 ohm$^{-1}$.cm$^{-1}$ and more preferably from $10^{-6}$ to $10^{-2}$ ohm$^{-1}$.cm$^{-1}$.

The electrically conductive liquid crystalline substances of this invention are quite novel, and electrical conductivity is developed through the charge-transfer complex (molecules) at the side-chain. One great characteristic of the electrically conductive liquid crystalline substance of this invention is that the orientation of the charge-transfer molecules can be controlled by an operation mechanism inherent to liquid crystalline substances.

The electrically conductive liquid crystalline substance of this invention can be incorporated into a polymer chain as a side chain to obtain an electrically conductive liquid crystalline polymer which is schematically shown as follows:

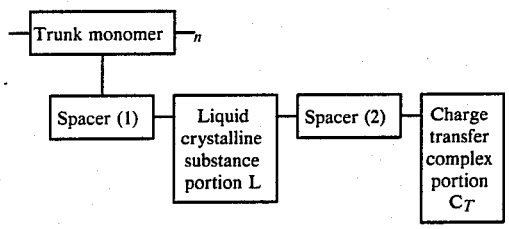

In the above scheme, n represents the degree of polymerization. In this illustration, the liquid crystalline substance portion L is bonded to the trunk monomer through the spacer (1), but the bonding may be direct without the intermediary of the spacer. Likewise, the charge transfer complex portion $C_T$ may, if desired, be bonded directly to the liquid crystalline substance portion L without the intermediary of the spacer (2). Furthermore, the sequence of bonding of L and $C_T$ may be reversed. In other words, $C_T$ may be bonded to the trunk monomer either directly or through the spacer. The polymer is constituted by the repeating units shown above with the degree of polymerization (n) of about 20 to about 1,000.

The preferred example of the polymer of this invention is represented by the following general formula (VIII)

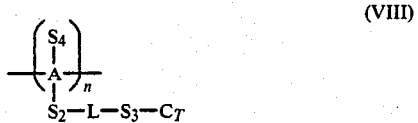

(VIII)

wherein
n: the degree of polymerization,
A: the repeating unit constituting the trunk polymer,
$S_2$ and $S_3$: an atom or atomic grouping which becomes a spacer,
$S_4$: a substituent,
L: the liquid crystalline substance portion,
$C_T$: the charge-transfer complex portion.

L in the above formula represents a residue of a liquid crystalline substance, and one or more liquid crystalline substances may be used. The portion L may be bonded on the trunk polymer in the following modes.

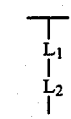

(IX)

(X)

($L_1$ and $L_2$ represent residues of liquid crystalline substances.)

Examples of the repeating unit A constituting the trunk polymer in general formula (VIII) include C, Si, P, $C_{m1}$ (wherein $m_1$ is an integer of 2 or more, and $C_{m1}$ may form a ring), —O—, —CH$_2$—, —CF$_2$—, —CHF—, —S—,

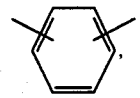

$R_5$ (which is other than the above-illustrated groups and represents an aliphatic hydrocarbon radical, an aromatic hydrocarbon radical, the ether, ester, ketone or amide thereof, a urethane residue, or the substitution product of any one of these), and —$R_5$—CH$_2$— ($R_5$ is as defined above).

Examples of the trunk polymer constituting the electrically conductive liquid crystalline polymer of the invention include silicone polymers, acrylic polymers, methacrylic polymers, styrene polymers, and condensation polymers such as polyethers, polyesters, phenol-formaldehyde resins, polycarbonates and polyamides. Polyaddition polymers such as epoxy polymers and urethane polymers may also be used. These polymers have a degree of polymerization (n) of about 20 to about 1,000.

In the general formula (VIII) for the electrically conductive liquid crystalline polymer of this invention, examples of the atom or atomic grouping as the spacer $S_2$ and $S_3$ include those defined for the spacer $S_1$ in general formula (I) above.

Examples of the substituent $S_4$ in general formula (VIII) include a hydrogen atom, halogen atoms, aliphatic hydrocarbon radicals, aromatic hydrocarbon radicals, the ethers, esters, ketones and amides thereof and urethane residues, and the substituted products thereof.

In the electrically conductive liquid crystalline polymer of this invention, a residue of a liquid crystal can be introduced by utilizing known liquid crystalline substances as described above.

A charge-transfer complex is involved in the imparting of electric conductivity in the electrically conductive liquid crystalline polymer of this invention. In other words, electric conductivity is developed by a charge-transfer complex composed of a host component (including molecules) and a guest component (including molecules) bonded to the liqud crystal residue L directly or through a spacer. The host component (molecules) may be an electron donor and the guest component (molecules), an electron acceptor, or vice versa.

Examples of the electron donor and the electron acceptor are the same as those given above dealing with the electrically conductive liquid crystalline substance of this invention.

Synthesis of the charge-transfer complex may be effected in the stage of a monomer to be polymerized, or after the preparation of the polymer. The latter, however, is preferred. The charge-transfer complex may be synthesized by complexing an acceptor component with a donor component which has previously been bonded to the liquid crystal component, or by complexing the donor component to the acceptor component which has previously been bonded to the liquid crystal component. The former is preferred, however.

The method of complexing which can be employed is the same as described above, and the same mole ratios of the donor molecules to the acceptor molecules as described above can be used.

The method of producing the electrically conductive liquid crystalline polymer of this invention will be described below in detail.

(1) Synthesis of a Monomer

A method of synthesizing a polymerizable monomer having a liquid crystalline portion is disclosed, for example, in Japanese Patent Application (OPI) No. 21479/80 (the term "OPI" as used herein refers to a "published unexamined Japanese patent application"), and in this invention a method similar to this known method can be used.

One example of the method for producing a monomer in the synthesis of the electrically conductive liquid crystalline polymer of the invention is described with regard to the monomer exemplified below:

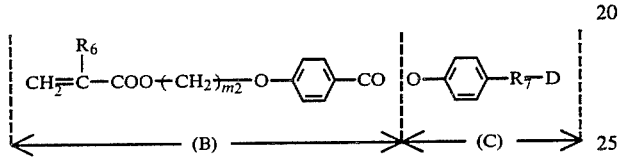

In the above formula, $R_6$ represents hydrogen or an organic group such as a methyl group; $m_2$ is an integer of from 2 to 10; $R_7$ is

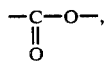

and D is an aromatic hydrocarbon radical (donor component such as

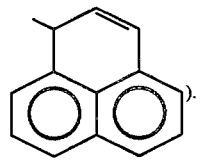

).

Component (B) is synthesized, for example, in accordance with the following scheme.

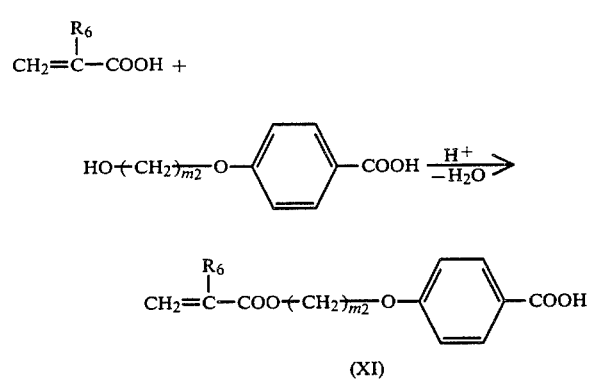

Component (C) is synthesized, for example, in accordance with the following scheme.

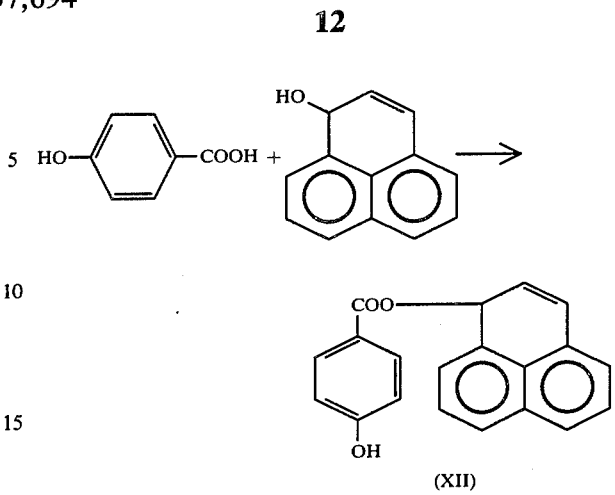

Esterification reaction between the compound of formula (XI) and the compound of formula (XII) gives the aforesaid monomer.

When $R_7$ is $-COO(CH_2)_{m_3}COO$ (wherein $m_3$ is an integer of from 1 to 10) and D is

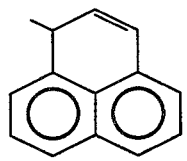

component (C) is synthesized in accordance with the following scheme.

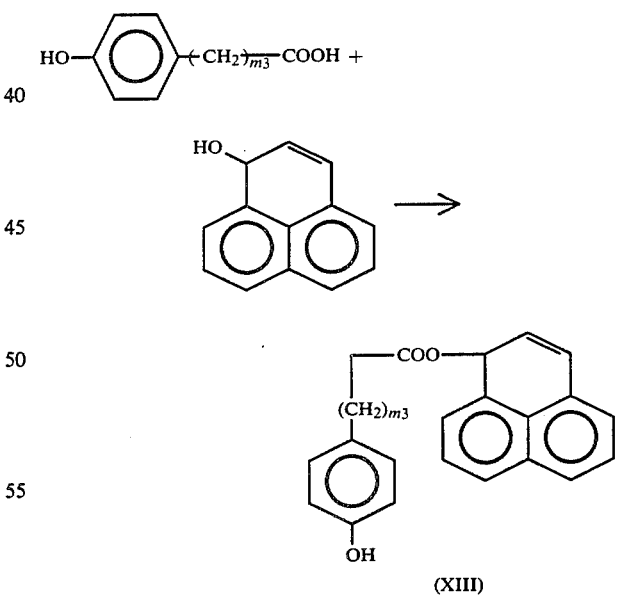

The reaction of the compound of formula (XIII) with the compound of formula (XI) gives the corresponding monomer.

The above description refers to the synthesis of the monomer by esterification, but there can also be employed alkylation utilizing a Grignard reaction, a Friedel-Crafts reaction, a Wurtz reaction, etc.

(2) Synthesis of the Polymer

The monomer synthesized as above may be polymerized. The polymerization may be carried out by various methods such as solution, bulk, emulsion and suspension polymerization techniques. A polymer reaction with a silicone polymer as described in Japanese Patent Application (OPI) No. 79173/81 may also be utilized in this invention. Polycondensation and polyaddition are also feasible in this invention.

The synthesis of the polymer and the synthesis (introduction) of the charge-transfer complex are schematically shown below.

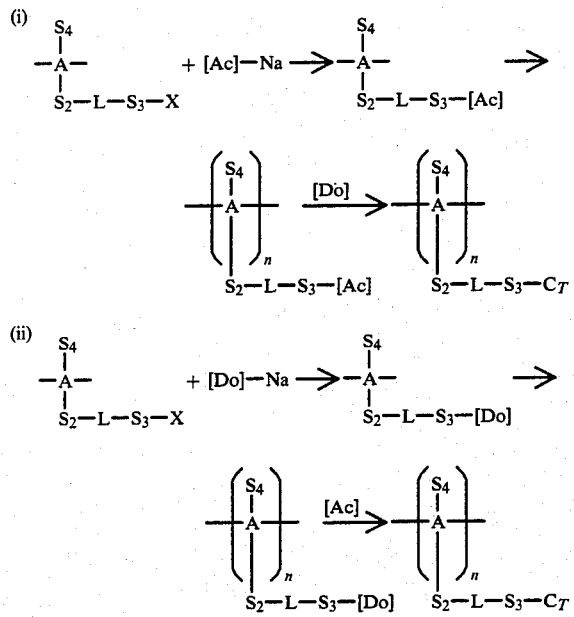

wherein
[Ac]: acceptor,
[Do]: donor,
$C_T$: the charge-transfer complex,
A, $S_2$, $S_3$, $S_4$ and n: the same as in general formula (VIII)
X: Cl, Br and I Thus, according to this invention, new electrically conductive liquid crystalline polymers are obtained. Heretofore, polymers utilizing the conjugated system of the main chain, such as polyacetylene [(CH)$_x$], and those utilizing a complex with a metal have been proposed. The polymer in accordance with this invention is quite novel in that it develops electrical conductivity through the charge-transfer complex (molecules) of the side chain. One great characteristic of the polymer of the invention is that the orientation of the charge-transfer molecules can be controlled by an operating mechanism inherent to the liquid crystalline polymer.

Since the electrical conductivity of the electrically conductive liquid crystalline substance and polymer of this invention is controlled by temperature, they are useful as a temperature sensor utilizing this property. Specifically, since the electric conductivity of the liquid crystalline substance and polymer of this invention is in correlation with the transition point of the liquid crystal (crystalline phase→smectic phase S→nematic phase N→isotropic liquid phase I) (and the glass transition point of the trunk polymer in the case of the polymer), and the electrical conductivity is controlled by temperature, the electrically conductive liquid crystalline substance and polymer of the invention are suitable for application to uses which take advantage of this property.

Furthermore, the electrically conductive liquid crystalline substance and polymer of this invention are useful as an amplifier or sensor because their electrical conductivity is controlled in an electric field, namely, the conductivity increases by field control of the liquid crystals. As is the case with ordinary liquid crystalline substances, the optical characteristics of the electrically conductive liquid crystalline substance and polymer of this invention are controlled in an electric field, but as a result of imparting electric conductivity, the substance and polymer of this invention can be used in a diversity of displays meeting a diversity of needs. Since an electric signal can be memorized in the substance and polymer of this invention, they are also useful as a memory. The substance and polymer of this invention may also be used as a soft copy because their electrical conductivity increases by guest molecules and varies with an electrostatic field. They are further useful as piezoelectric elements, gas sensors, solar batteries utilizing their photovoltaic effect, electrodes, gas-chromatographic devices, superconductors, etc., and it is expected to find various other uses which may be developed as a result of imparting electric conductivity. The electrically conductive liquid crystalline substance and polymer of this invention are also expected to produce new effects in the conventional applications of liquid crystals.

The electrically conductive liquid crystalline substance and polymer of the invention have better strength, adhesiveness, transparency, functionality, (and better film forming property in the case of the polymer) than conventional organic electrically conductive materials (low molecular weight materials), and also better moldability, durability, functionality and transparency than conventional electrically conductive polymeric materials such as polyacetylene, poly(p-phenylene) and polypyrrole. Since the liquid crystalline substance and polymer of this invention have electrical conductivity by themselves, when they are used in as a display element, they do not require a conductive electrode as is the case with conventional liquid crystalline material, and their response speeds are faster than the conventional liquid crystalline substances. Accordingly, the electrically conductive liquid crystalline substance and polymer of this invention are very useful in industry.

The following Examples illustrate the present invention more specifically. However, the scope of the invention is not limited to the Examples.

EXAMPLE 1

A 3-liter three-necked round bottom flask was equipped with a mechanical stirrer, a thermometer, an addition funnel, a reflux condenser, and a means for providing nitrogen atmosphere. To the flask were added 104 g (0.5 mole) of p-acetoxyphenoxyethanol and 0.5 liter of dry tetrahydrofuran. Then, a solution of 12 g (0.5 mole) of sodium hydride dispersed in 30 ml of dry tetrahydrofuran was added dropwise over a period of 1 hour at 0° C. Subsequently, a solution of 100 g (0.4 mole) of chloranil dispersed in 1 liter of dry tetrahydrofuran was dropwise added over a period of 3 hours at 0° C. After stirring for an additional 1 hour at room temperature, the resulting solution was filtered off, and the filtrate was condensed near to dryness. The residue was hydrolyzed by 1 liter of an aqueous ethanol solution containing 1.25N potassium hydroxide over a period of 2 hours at 50° C. to give 160 g of a compound of the following formula (1)

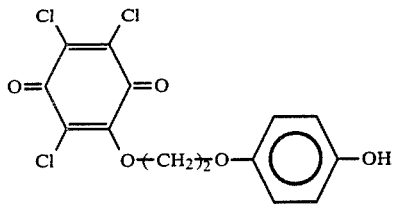

The structure of the product was determined from the fact that in its infrared absorption spectrum, a characteristic carbonyl absorption of chloranil was seen at 1,680 cm$^{-1}$.

Then, 80 g (0.2 mole) of the compound of formula (1) and 32 g (0.2 mole) of p-cyanobenzoic acid were dissolved in 1 liter of dry tetrahydrofuran, and the solution was cooled to 0° C. To the solution was added dropwise, with stirring, a solution of 50 g of dicyclohexyl carbodiimide in a mixture of 20 ml of dry tetrahydrofuran and 20 ml of chloroform. The mixture was reacted at 0° C. for 4 hours, and then allowed to stand at room temperature for 24 hours. The precipitated white solid (dicyclohexylurea) was discarded, and the tetrahydrofuran was evaporated from the solution. The remaining crude product was dissolved in 1.2 liters of hot ethyl acetate and cooled to −30° C. to crystallize the product. The thus-obtained crystals were recrystallized from ethyl acetate to give 110 g of a compound of formula (2)

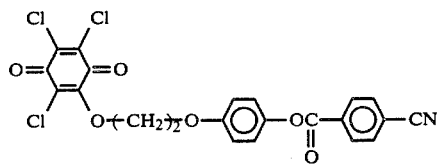

Elementary Analysis for $C_{22}H_{12}N_1O_6Cl_3$:

|  | C | H | N | Cl |
|---|---|---|---|---|
| Calc'd (%): | 53.96 | 2.47 | 2.86 | 21.10 |
| Found (%): | 54.35 | 2.50 | 2.73 | 20.89 |

Then, 50 g (0.1 mole) of the compound of formula (2) was dissolved in 90 ml of ethyl acetate, and a solution of 20 g (0.1 mole) of pyrene in 80 ml of ethyl acetate was added dropwise at room temperature to the resulting solution. The mixture was stirred for 1 hour, and then the ethyl acetate was evaporated to give an electrically conductive liquid crystalline substance of formula (3). Elemental analysis showed that the ratio of the host component to the guest component was 1/1.

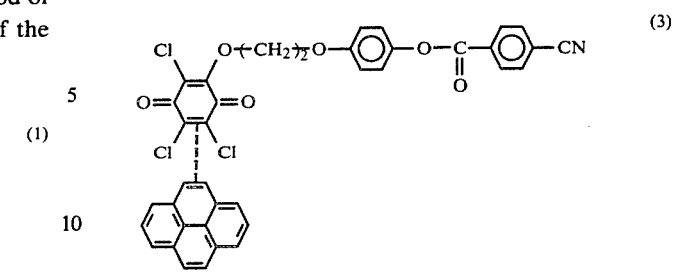

EXAMPLE 2

In a 3-liter three-necked round bottom flask equipped with a mechanical stirrer, a thermometer, an addition funnel and a reflux condenser, 115 g (0.5 mole) of fluoranthene and 80 g (0.6 mole) of anhydrous aluminum chloride and 1 liter of nitrobenzene were charged. The resulting solution was stirred, and a solution of 155 g (0.5 mole) of p-(p-toluenesulfonamino)benzoyl chloride in 0.5 liter of nitrobenzene was added dropwise to the flask over a period of 1 hour at 80° C. After the reaction mixture was allowed to stand over a period of 1 hour at that temperature, it was poured onto 2 liters of ice-cooled water solution acidified with conc. HCl. The oil layer was collected, and nitrobenzene was evaporated under reduced pressure to give a yellow mass. The mass was hydrolyzed in 1 liter of an aqueous ethanolic solution containing 1.25N potassium hydroxide for 2 hours at 80° C., and the product was recrystallized from toluene to give a compound of the following formula (4).

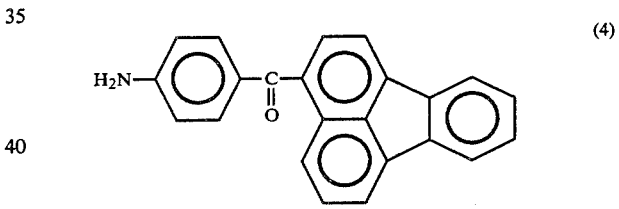

Then, 100 g (0.3 mole) of the compound of formula (4) and 45 g (0.3 mole) of p-ethoxybenzaldehyde were dissolved in 800 ml of ethanol. While refluxing the ethanol at 80° C., the reaction was carried out for 3 hours. Then, the ethanol was evaporated, and the residue was recrystallized from ethanol to give 130 g of a compound of the following formula (5).

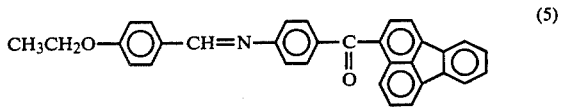

The structure of the product was determined from the characteristic absorption of azomethine at 1,640 cm$^{-1}$, aromatic aliphatic ether linkage at 1,260 cm$^{-1}$ and carbonyl absorption at 1,665 cm$^{-1}$ in its infrared absorption spectrum and from the results in elementary analysis.

Elementary Analysis for $C_{32}H_{23}NO_2$:

|  | C | H | N |
|---|---|---|---|
| Calc'd (%): | 84.73 | 5.12 | 3.09 |

| | C | H | N |
|---|---|---|---|
| Found (%): | 84.28 | 5.35 | 3.13 |

Then, 45 g (0.1 mole) of the compound of formula (5) was dissolved in 100 ml of alcohol, and a solution of 13 g (0.1 mole) of tetracyanoethylene in 80 ml of alcohol was added dropwise to the resulting solution at −20° C. The mixture was stirred for 1 hour, and the alcohol was evaporated to give an electrically conductive liquid crystalline substance of formula (6) below. Elemental analysis showed that the ratio of the host component to the guest component was 1/1.

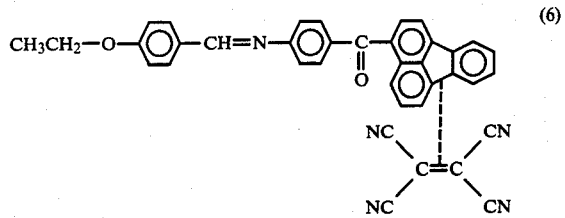

(6)

EXAMPLE 3

100 g (0.55 mole) of perinaphthenone and 20.8 g (0.55 mole) of sodium borohydride were dissolved in 1 liter of aqueous tetrahydrofuran and reacted at 50° C. for 8 hours.

A fraction having a hydroxyl absorption was collected by column chromatography (with a column of Shodex), and 90 g (0.5 mole) of the resulting perinaphthenol was obtained.

Then, 90 g (0.5 mole) of the resulting perinaphthenol and 70 g (0.5 mole) of p-hydroxybenzoic acid were dispersed in 0.5 liter of toluene, and 1 ml of concentrated sulfuric acid was added thereto. The mixture was refluxed and esterified in a flask equipped with Dien-Stark water separator for 5 hours. The resulting solution was washed with 0.1 liter of a 10% aqueous sodium hydroxide solution two times, and further washed with 0.2 liter of water three times. Subsequently, toluene was evaporated, and the residue was recrystallized from tetrahydrofuran to give 80 g of a compound of formula (7) having characteristic absorption of the ester group at 1,720 and 1,210 cm$^{-1}$ in its infrared absorption spectrum.

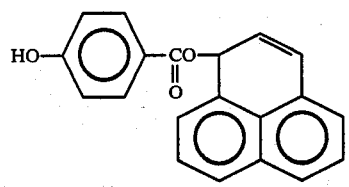

(7)

Then, 78 g (0.26 mole) of the compound of formula (7) and 46 g (0.26 mole) of p-n-butylbenzoic acid were dissolved in 1 liter of dry tetrahydrofuran, and the solution was cooled to 0° C. To the solution was added dropwise a solution of 60 g (0.29 mole) of dicyclohexyl carbodiimide in a mixture of 40 ml of dry tetrahydrofuran and 40 ml of dry chloroform with stirring. The reaction was performed at 0° C. for 4 hours, and allowed to stand overnight at room temperature. The precipitated white solid (dicyclohexylurea) was discarded, and the solvent was stripped from the remaining solution. The crude product was dissolved in 800 ml of ethyl acetate, and the solution was cooled to −30° C. to crystallize the product. Repeated recrystallization gave 100 g of a compound of formula (8). The structure of the product was determined by elementary analysis.

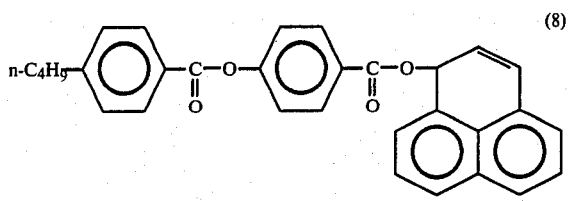

(8)

Elementary Analysis for $C_{31}H_{25}O_4$:

| | C | H |
|---|---|---|
| Calc'd (%): | 80.66 | 5.47 |
| Found (%): | 81.03 | 5.50 |

Then, 46 g (0.1 mole) of the compound of formula (8) was dissolved in 300 ml of ethyl acetate, and the solution of 26 g (0.1 mole) of chloranil in 100 ml of ethyl acetate was added dropwise at room temperature to the resulting solution. The mixture was stirred for 1 hour, and ethyl acetate was evaporated to give an electrically conductive liquid crystalline substance of the following formula (9). Elementary analysis showed that the ratio of the host component to the guest component was 1/1.

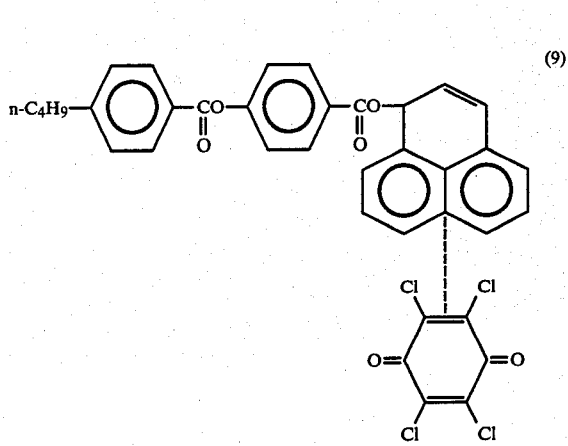

(9)

EXAMPLE 4

A 1-liter three-necked round bottom flask was equipped with a mechanical stirrer, an addition funnel, Dry Ice/acetone reflux condenser and a means for providing nitrogen atmosphere. To the flask were added 67 g (0.4 mole) of carbazole, 11 g (0.44 mole) of sodium hydride and 0.5 liter of dry tetrahydrofuran. After stirring vigorously at 0° C. for about 2.5 hours, 18 g (0.4 mole) of ethylene oxide was added dropwise to the reaction mixture over a period of 1 hour at 0° C. After the addition, stirring was continued for additional 5 hours and the tetrahydrofuran was evaporated. The residue was fully washed with water and then recrystallized from ether to give 80 g of N-(2-hydroxyethyl)carbazole.

Furthermore, 80 g (0.48 mole) of p-nitrobenzoic acid and 74 g (0.48 mole) of p-nitroanisole were dissolved in 1.2 liters of methanol, and a solution of 40 g (1 mole) of sodium hydroxide in 80 ml of water was added to the resulting solution. Then, 31 g (0.48 mole) of zinc powder was added, and the mixture was refluxed for 10 hours. The solution was cooled to room temperature, and after standing, preciptates in the reaction product were discarded. Subsequently, the methanol was removed from the remaining solution to give a crude product. 200 ml of water was added into the crude product, heated to 80° C. and filtered. The filtrate was acidified to pH 4 by conc. HCl to give orange mass. Recrystallization from methanol gave 140 g of a compound of formula (10). The structure of the compound of formula (10) was determined from the absorption of azo group at 1,575 cm$^{-1}$ in its Raman spectrum.

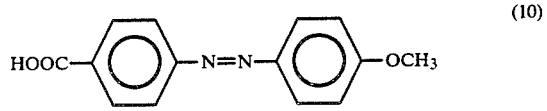
(10)

Then, 95 g (0.37 mole) of the compound of formula (10) and 78 g (0.37 mole) of N-(2-hydroxyethyl)carbazole were dissolved in 1 liter of dry tetrahydrofuran, and the solution was cooled to 0° C. Then, a solution of 82 g (0.4 mole) of dicyclohexyl carbodiimide in a mixture of 50 ml of dry tetrahydrofuran and 50 ml of dry chloroform was added dropwise to the resulting solution with stirring. The reaction was performed at 0° C. for 4 hours and allowed to stand overnight at room temperature. The precipitated dicyclohexylurea was filtered, and the solvent was evaporated to give a crude product which was recrystallized from ethanol to give 160 g of a compound of formula (11). The structure of the product was determined by elementary analysis.

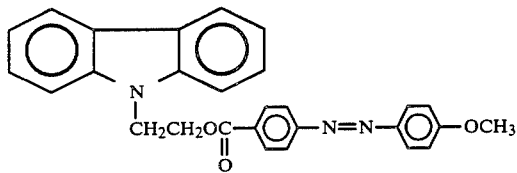
(11)

Elementary Analysis for C$_{28}$H$_{23}$N$_2$O$_3$:

|  | C | H | N |
|---|---|---|---|
| Calc'd (%): | 77.21 | 5.33 | 6.43 |
| Found (%): | 77.38 | 5.30 | 6.51 |

43.5 g (0.1 mole) of the compound of formula (11) was dissolved in 100 ml of acetonitrile, and a solution of 20 g (0.1 mole) of tetracyanoquinodimethane in 200 ml of acetonitrile was added dropwise to the resulting solution at 0° C. The mixture was stirred for 1 hour, and the acetonitrile was evaporated to give an electrically conductive liquid crystalline substance of formula (12).

Elementary analysis showed that the ratio of the guest component to the host component was 1/1.

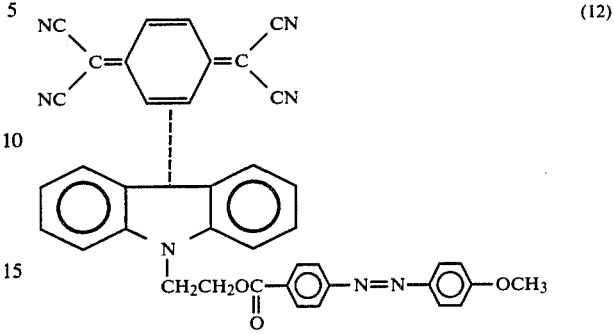
(12)

EXAMPLE 5

33 g (0.2 mole) of 3-(p-hydroxyphenyl)propionic acid was dissolved in a mixture of 320 g of pyridine and 1 liter of methylene dichloride and cooled to 0° C. A solution of 62 g (0.2 mole) of 4-(1-pyrenyl)butanoyl chloride in 500 ml of methylene chloride was added dropwise into the above solution over a period of 2 hours and after addition the reaction mixture was stirred for 1 hour at room temperature. The resulting mixture was poured into 1 liter of 1N hydrochloric solution and the organic layer was separated. The crude product obtained by the evaporation of methylene dichloride was recrystallized from ethyl acetate to give 80 g of a compound of formula (13).

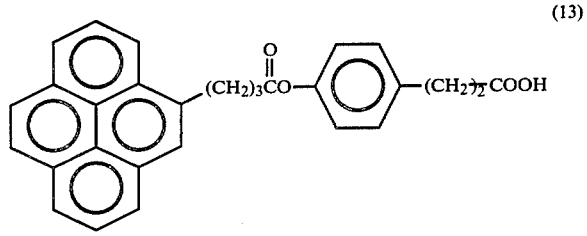
(13)

Then, 79 g (0.18 mole) of the compound of formula (13) and 70 g (0.18 mole) of cholesterol were dissolved in 1 liter of dry tetrahydrofuran, and the solution was cooled to 0° C. A solution of 41 g (0.2 mole) of dicyclohexyl carbodiimide in a mixture of 60 ml of dry tetrahydrofuran and 60 ml of dry chloroform was added dropwise into the above solution with stirring. Subsequently, the reaction was performed at 0° C. for 4 hours, and allowed to stand overnight at room temperature. The precipitated white solid (dicyclohexylurea) was discarded, and the solvent was stripped from the remaining solution. The thus-obtained crude product was dissolved in ethyl acetate, and repeatedly recrystallized to give 120 g of a compound of the following formula (14). The structure of the product was determined by elementary analysis.

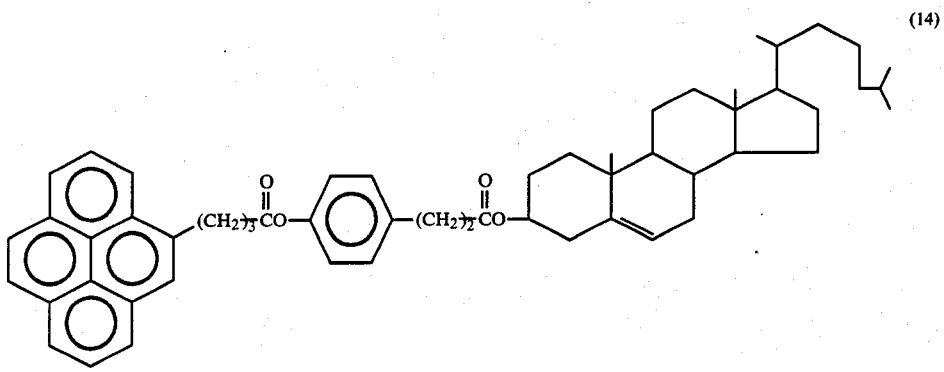

Elementary Analysis for $C_{56}H_{68}O_4$:

|  | C | H |
|---|---|---|
| Calc'd (%): | 83.52 | 8.53 |
| Found (%): | 83.05 | 8.13 |

0.64 g (5 mmole) of purified iodine was added into a solution composed of 4 g (5 mmole) of the compound of formula (14) in 100 ml of ethyl acetate. The mixture was stirred for 2 hours, and the ethyl acetate was evaporated to give an electrically conductive liquid crystalline substance of formula (15). Elementary analysis showed that the ratio of the guest component to the host component was 0.9/1.

late was removed under a reduced pressure to give crude 4-(2-acryloyloxyethoxy)benzoic acid.

Then, 237 g (2 mole) of freshly distilled thionyl chloride was added into the crude product at room temperature and the mixture was maintained at 30° to 40° C. for 20 hours. The excess thionyl chloride was removed under a reduced pressure to give crude 4-(2-acryloyloxyethoxy)benzoyl chloride. The product was recrystallized from petroleum ether.

(2) Synthesis of 1-perinaphthenyl-4-[4-(2-acryloyloxyethoxy)benzoyloxy]benzoate

In a 250 ml of a three-necked round bottom flask equipped with a mechanical stirrer, a thermometer, an addition funnel and a reflux condenser were charged 18 g (0.06 mole) of perinaphthenyl 4-hydroxybenzoate

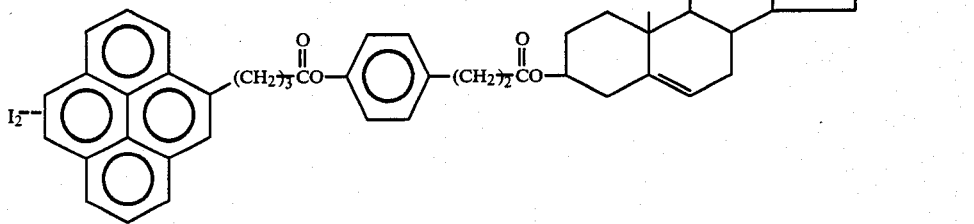

EXAMPLE 6

(1) Synthesis of 4-(2-acryloyloxyethoxy)benzoyl chloride

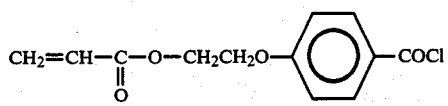

In a 500-ml three-necked round bottom flask equipped with a thermometer, a reflux condenser-equipped Dien-Stark trap and a mechanical stirrer were charged 50 g (0.21 mole) of 4-(2-hydroxyethoxy)benzoic acid and 182 g (2.1 mole) of methyl acrylate, 0.8 g of hydroquinone and 0.80 g of p-toluenesulfonic acid monohydrate. The reaction mixture was heated to 76° C. and a methanol/methyl acrylate azeotropic mixture produced by the ester exchange reaction was removed. The reaction temperature was maintained at about 70°–80° C. for 5 hours and the excess methyl methacrysynthesized in Example 3, 6.7 g of triethylamine and 100 ml of dry chloroform. Subsequently, a solution of 17 g (0.066 mole) of 4-(2-acryloyloxyethoxy)benzoyl chloride in 80 ml of dry chloroform was added dropwise over a period of 1 hour at 0° C. The mixture was stirred for 0.5 hour at 0° C. and allowed to stand overnight at room temperature. Then, the precipitated triethylamine hydrochloride was repeated by filtration, and the filtrate was concentrated under a reduced pressure to give a pale yellow crude acrylate. The crude product was repeatedly purified by the recrystallization from ethyl acetate to give 22 g of pure acrylate. Elementary Analysis for $C_{32}H_{23}O_7$:

|  | C | H |
|---|---|---|
| Calc'd (%): | 73.97 | 4.47 |
| Found (%): | 73.84 | 4.40 |

EXAMPLE 7

(1) Synthesis of 4-(2-methacryloyloxyethoxy)benzoyl chloride

This compound was synthesized by the reaction of 4-(2-hydroxyethoxy)benzoic acid, methyl methacrylate and thionyl chloride in the same manner as in Example 6-(1).

(2) Synthesis of 4-(1-oxo-3'-fluoranthenylmethyl)phenol

In a 3-liter three-necked round bottom flask equipped with a mechanical stirrer, a thermometer, an addition funnel and a reflux condenser were charged 115 g (0.57 mole) of fluoranthene and 80 g (0.6 mole) of anhydrous aluminum chloride and 0.5 liter of nitrobenzene. The resulting solution was stirred and a solution of 85 g (0.5 mole) of p-methoxy benzoyl chloride in 0.5 liter of nitrobenzene was added dropwise to the flask over a period of 1 hour at 80° C. After the reaction mixture was allowed to stand over a period of 1 hour at that temperature, it was poured onto 2 liters of an ice-cooled water solution acidified with concentrated hydrogen chloride. The thus-obtained organic layer was separated and washed several times with water and dried over anhydrous magnesium sulfate. After filtration of magnesium sulfate, nitrobenzene was removed under a reduced pressure to give a yellow mass. The mass was dissolved in a mixture of 500 ml of acetic acid and 500 ml of 48% hydrobromic acid, followed by refluxing for 5 hours to give 4-(1-oxo-3'-fluoranthenylmethyl)phenol in yield of 83% after recrystallization from toluene.

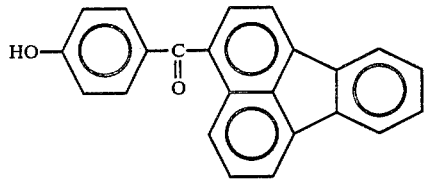

(3) Synthesis of 4-(1-oxo-3'-fluoranthenylmethyl)phenyl 4-(2-methacryloyloxyethoxy)benzoate 4-(2-methacryloyloxyethoxy)benzoyl chloride was synthesized by the reaction of 4-(2-hydroxyethoxy)benzoic acid with methyl methacrylate, followed by the reaction with thionyl chloride in the same manner as in Example 6-(1). By the condensation reaction of 4-(2-methacryloyloxyethoxy)benzoyl chloride with 4-(1-oxo-3'-fluoranthenylmethyl)phenol in the presence of triethylamine as hydrogen chloride acceptor in chloroform in the same manner as in Example 6-(2), 4-(1-oxo-3'-fluoranthenylmethyl)phenyl 4-(2-methacryloyloxyethoxy)benzoate was synthesized. The yield of methacrylate was 75%.

Elementary Analysis for $C_{36}H_{26}O_6$:

|  |  | C | H |
|---|---|---|---|
| Calc'd | (%): | 77.96 | 4.73 |
| Found | (%): | 77.61 | 4.68 |

EXAMPLE 8

(1) Synthesis of 4-(2-acryloyloxyethoxy)phenol

A mixture of 50 g (0.32 mole) of 4-(2-hydroxyethoxy)phenol, 29 g (0.4 mole) of acrylic acid, 1.2 g of p-toluenesulfonic acid monohydrate and 0.35 g of hydroquinone was refluxed for 5 hours in 200 ml of toluene in a 500-ml round bottom flask equipped with a Dien-Stark water separator and a reflux condenser. The cooled reaction solution was washed several times with water to remove the excess acrylic acid and p-toluenesulfonic acid. The organic layer was dried over anhydrous sodium sulfate for an overnight. After filtration of sodium sulfate, toluene was removed under a reduced pressure to give a pale yellow mass. The crude product was recrystallized from toluene to give pure acrylate.

(2) Synthesis of 4-(1-oxo-3'-fluoranthenylmethyl)benzoic acid 101 g (0.5 mole) of fluoranthene and 80 g (0.6 mole) of anhydrous aluminum chloride were dissolved in 1 liter of nitrobenzene, and 7.7 g (0.5 mole) of p-toluyl chloride in 200 ml of nitrobenzene was added dropwise at 80° C. over a period of 1 hour. After the reaction mixture was allowed to stand over a period of 1 hour at that temperature, it was poured onto 2 liters of an ice-cooled water solution acidified with concentrated hydrogen chloride. The thus-obtained organic layer was separated and washed with 1 liter of 1N sodium hydroxide solution, followed by washing with water several times and drying over anhydrous sodium sulfate for an overnight. After filtration of sodium sulfate, nitrobenzene was removed under a reduced pressure to give a pale yellow mass. The crude product was recrystallized several times from n-hexane to give 81 g (yield: 25.3%) of 4-(1-oxo-3'-fluoranthenylmethyl)toluene.

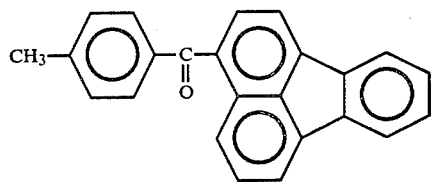

To a solution of 80 g (0.25 mole) of 4-(1-oxo-3'-fluoranthenylmethyl)toluene in 225 ml of concentrated sulfuric acid (30° C.) was slowly added 75 g (0.75 mole) of chromic anhydride in small portions with stirring, while maintaining the temperature at 40°–45° C. After 4 hours, the solution was poured onto ice, and crude 4-(1-oxo-3'-fluoranthenylmethyl)benzoic acid was collected and washed with water several times. The product was purified by dissolving in alkali aqueous solution, separating insoluble parts and acidification of filtrate.

Elementary Analysis for $C_{24}H_{14}O_3$:

|  |  | C | H |
|---|---|---|---|
| Calc'd | (%): | 82.26 | 4.04 |
| Found | (%): | 82.10 | 3.95 |

(3) Synthesis of 4-(2-acryloyloxyethoxy)phenyl 4-(1-oxo-3'-fluoranthenylmethyl)benzoate 4-(1-oxo-3'-fluoranthenylmethyl)benzoyl chloride was synthesized by the reaction of a corresponding benzoic acid with thionyl chloride in the same manner as in Example 6-(1). The benzoyl chloride was subjected to condensation reaction with 4-(2-acryloyloxyethyoxy)phenol in the same manner as in Examples 6-(2) and 7-(3), whereby 4-(2-acryloyloxyethoxy)phenyl 4-(1-oxo-3'-fluoranthenylmethyl)benzoate was synthesized.

Elementary Analysis for $C_{35}H_{24}O_6$:

| | C | H |
|---|---|---|
| Calc'd (%): | 77.76 | 4.48 |
| Found (%): | 77.28 | 4.25 |

EXAMPLE 9

(1) Polymerization reaction

Each of the polymerizable monomer synthesized in Examples 6 to 8 was dissolved in purified toluene in an amount of 10 wt%, and subjected to solution polymerization at 60° C. for 20 hours in the presence of azobisisobutyronitrile (AIBN) as a radical polymerization initiator in vacuum sealed tubes. The resulting polymer was precipitated using 10 times the amount of polymer solution of methanol and filtrated. The polymer was re-precipitated with a mixture of toluene and methanol and dried. The yields of the polymers were as shown in Table 1 below.

TABLE 1

| | Yield (wt %) of Polymer Amount (wt %/monomer) of AIBN | | |
|---|---|---|---|
| Monomer | 1 | 2 | 4 |
| Monomer of Example 6-(2) | 22 | 31 | 41 |
| Monomer of Example 7-(3) | 35 | 42 | 59 |
| Monomer of Example 8-(3) | 26 | 33 | 46 |

(2) Complex formation with guest molecules

Each of the polymers (obtained by 4 wt% of AIBN) was dissolved in ethyl acetate in an amount of 2%, and a 10% ethyl acetate solution of iodine (guest molecules) was added dropwise thereto. The mixture was stirred for 2 hours, and then ethyl acetate was evaporated, followed by washing with n-hexane to give an electrically conductive liquid crystalline polymer.

EXAMPLE 10

(1) Synthesis of 1-perinaphthenyl-4-[4-(2-propenyloxy)-benzoyloxy]benzoate

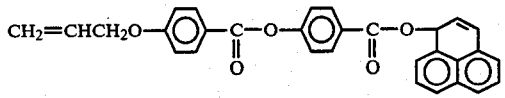

4-Hydroxybenzoic acid was reacted with allyl bromide in the presence of sodium hydroxide. The crude product was recrystallized from ethanol.

The resulting 4-propenyloxy benzoic acid was dissolved in an excess of thionyl chloride, and boiled after attaching a refluxing device. Subsequently, the unreacted thionyl chloride was removed by vacuum distillation. The remaining acid chloride was taken into tetrahydrofuran.

Perinaphthenyl 4-hydroxybenzoate produced in the same manner as in Example 6-(2) was dissolved in tetrahydrofuran, and an equimolar amount of the aforesaid acid chloride in tetrahydrofuran was added dropwise while cooling. The reaction temperature was 5° C. After the addition, the mixture was boiled and refluxed further for 1 hour. Subsequently, the reaction product was put in ice water, and neutralized. The crude product as a precipitate was separated by filtration.

The resulting 1-perinaphthenyl-4-[4-(2-propenyloxy)-benzoyloxy]benzoate was recrystallized from ethanol.

(2) Graft polymer of methyl-hydrogen-polysiloxane and the product of Example 8-(1)

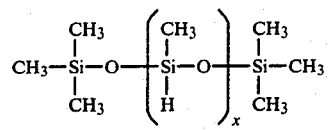

Methyl-hydrogen-polysiloxane of the above formula and the product obtained in Example 8-(1) in equimolar proportions were dissolved in tetrahydrofuran, and subsequently, hexachloroplatinic acid was added in an amount of 10 ppm based on the total amount. The reaction mixture was maintained overnight at 50° C.

The resulting organopolysiloxane graft polymer was precipitated with methanol, and finally dried in vacuum.

(3) Complexing with guest molecules $I_2$ was used as guest molecules and complexed with the polymer in the same manner as in Example 9-(2). Elemental analysis showed that the guest/host mole ratio was 1/1.

While the invention has been described in detail and with reference to specific embodiments thereof, it will be apparent to one skilled in the art that various changes and modifications can be made therein without departing from the spirit and scope thereof.

What is claimed is:

1. An electrically conductive liquid crystalline polymer having in the side chain of the polymer a moiety derived from an electrically conductive liquid crystalline compound represented by the following general formula (I) or (II)

$L-S_1-C_T$ $L-C_T$ wherein L is an organic residue with liquid crystalline characteristics, $S_1$ is an atom or atomic grouping which becomes a spacer, and $C_T$ is a charge-transfer complex comprising a guest component and a host component covalently bonded directly to said L or through a spacer to said L, said electrically conductive liquid crystalline polymer having an electrically conductivity of $10^{-8}$ to 1 $ohm^{-1}.cm^{-1}$.

2. An electrically conductive liquid crystalline polymer as claimed in claim 1, wherein the host component is an electron donor and the guest component is an electron acceptor.

3. An electrically conductive liquid crystalline polymer as claimed in claim 1, wherein the host component is an electron acceptor and the guest component is an electron donor.

4. An electrically conductive liquid crystalline polymer as claimed in claim 2, wherein the electron donor is selected from the group consisting of aromatic hydrocarbons, aliphatic amines, aromatic amines, heteroaromatic amines, fulvalene derivatives, phthalocyanine and derivatives thereof.

5. An electrically conductive liquid crystalline polymer as claimed in claim 4, wherein the electron acceptor is selected from the group consisting of halogens, metal halides, tetracyanoquinodimethane and derivatives thereof, tetracyanoethylene and derivatives thereof, substituted benzoquinones, trinitrobenzene and perchlorate.

6. An electrically conductive liquid crystalline polymer as claimed in claim 2, wherein the charge-transfer complex is obtained by complexing the acceptor component with the donor component bonded in advance to the liquid crystalline compound.

7. An electrically conductive liquid crystalline polymer as claimed in claim 3, wherein the charge-transfer complex is obtained by complexing the donor component to the acceptor component bonded in advance to the liquid crystalline compound.

8. An electrically conductive liquid crystalline polymer as claimed in claim 2, wherein the mole ratio of the donor to the acceptor is in the range of 10/1 to 1/10.

9. An electrically conductive liquid crystalline polymer as claimed in claim 8, wherein the mole ratio of the donor to the acceptor is in the range of 4/1 to ¼.

10. An electrically conductive liquid crystalline polymer as claimed in claim 9, wherein the mole ratio of the donor to the acceptor is in the range of 5/2 to ⅖.

11. An electrically conductive liquid crystalline polymer as claimed in claim 1, wherein the liquid crystalline polymer has an electrical conductivity of $10^{-6}$ to $10^{-2}$ $ohm^{-1}.cm^{-1}$.

* * * * *